T. F. BARRY.
BUTTON CUTTING MACHINE.
APPLICATION FILED AUG. 17, 1910.

999,429.

Patented Aug. 1, 1911.

Witnesses
M. E. Fowler
James F. Mansfield

Inventor
Thomas F. Barry
By Alexander Lowell
Attorneys

COLUMBIA PLANOGRAPH CO., WASHINGTON, D. C.

UNITED STATES PATENT OFFICE.

THOMAS F. BARRY, OF MUSCATINE, IOWA, ASSIGNOR TO BARRY MANUFACTURING COMPANY, OF MUSCATINE, IOWA, A CORPORATION OF IOWA.

BUTTON-CUTTING MACHINE.

999,429.  Specification of Letters Patent.  Patented Aug. 1, 1911.

Application filed August 17, 1910. Serial No. 577,675.

*To all whom it may concern:*

Be it known that I, THOMAS F. BARRY, of Muscatine, in the county of Muscatine and State of Iowa, have invented certain new and useful Improvements in Button-Cutting Machines; and I hereby declare that the following is a full, clear, and exact description thereof, reference being had to the accompanying drawings, which form part of this specification.

This invention relates to machines for cutting button blanks from shells and is particularly adapted for use on so-called "hand" machines. Such "hand" machines ordinarily comprising a rotatable spindle carrying a tubular saw, and an opposite "pusher" which can be advanced to and from the saw by manually operated devices, ordinarily a screw; the shell to be cut is interposed between the saw and the pusher, and advanced thereby toward the saw—to enable the latter to cut a blank therefrom; the shell being ordinarily held in position by means of tongs during the cutting operation.

It is quite essential to the successful operation of shell cutting machines that water be supplied to the saw and shell during the cutting operation, to keep down the temperature of the saw and shell and to cleanse the saw from the dust and cuttings. Heretofore water has been customarily supplied by means of a hose or pipe connected to the machine in some crude way so as to deliver water onto the saw during the cutting operation; but the present water supplying devices are "sloppy" and render the work very disagreeable to the operator and the saw is not properly cleansed, and the product of the machine is limited as the speed at which the blanks can be safely cut depends very largely upon the effectiveness of the water supply.

The object of the present invention therefore is to provide such machines with reliable adjustable water supplying devices preferably consisting of two adjustable nozzles which can be adjusted so as to discharge water in the most effective manner against the saw and shell at the cutting point and in such manner as will thoroughly wash out the saw-dust and keep the saw and shell cool; thus enabling the operator to increase the speed of cutting the blanks and consequently increasing the amount of blanks he can cut in a day.

Figure 1:
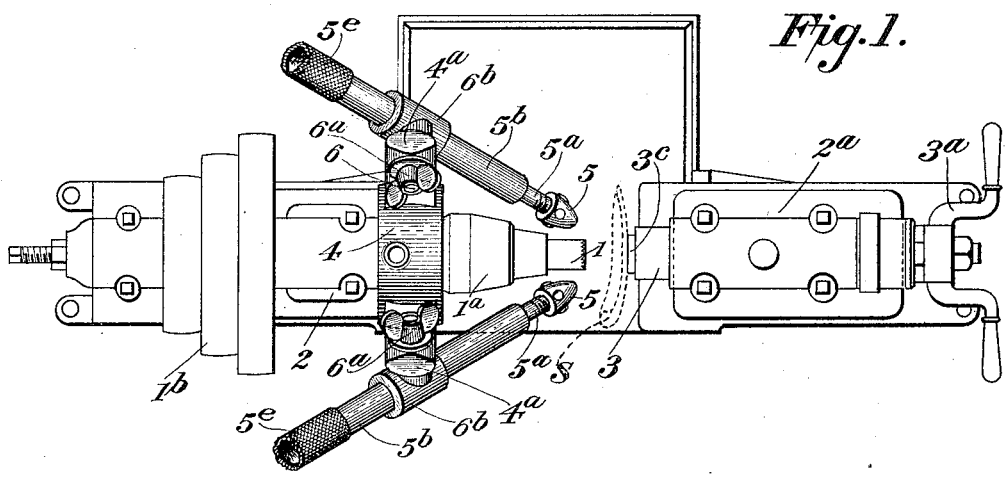
Figure 2:
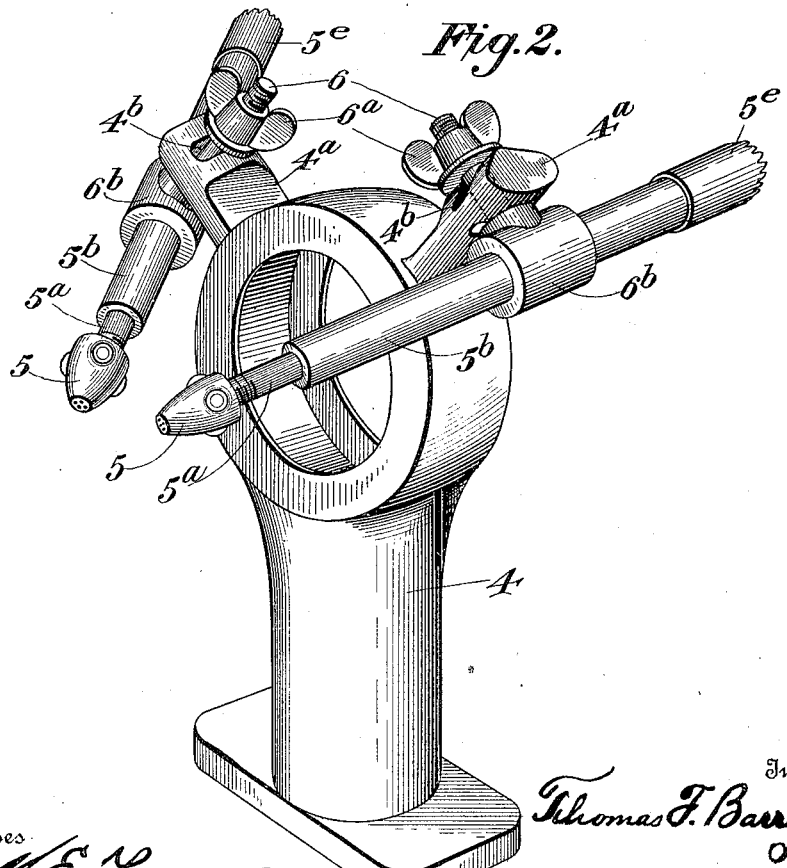

The invention therefore consists in the novel construction and combination of parts as hereinafter claimed, and an efficient embodiment thereof is illustrated in the accompanying drawings and explained in detail as follows:

In the drawings—Figure 1 is a plan view partly in section of a hand button blank cutting machine. Fig. 2 is an enlarged perspective view of the button blank trap and the adjustable nozzles thereon.

In the machine illustrated in said drawings the tubular saw 1 is connected to a spindle $1^a$, having bearings in the head-stock 2 of the machine, and said spindle can be driven by a stepped pulley $1^b$ belted to any suitable driver, not shown. Axially alined with the saw is a "pusher" 3, which is slidably mounted in the tail-stock $2^a$ of the machine and can be moved to and from the saw by means of a hand-lever or wheel $3^a$ on the outer end thereof; said pusher has a wooden plug $3^c$ in its inner end, opposite the saw, to prevent the latter running against metal when it cuts through the shell—which is indicated at S in dotted lines. Surrounding the spindle adjacent the head-stock is a button blank trap 4 into which the button blanks which pass axially through the saw are discharged and conducted to a suitable receptacle. The parts thus far described may be constructed as shown in my Patent #659,191 of October 2, 1900.

In cutting a blank from a shell the operator takes a shell in the tongs (not shown) as usual, and positions it between the saw and pusher while the latter is retracted; he then moves the pusher inward so as to force the shell into contact with the rapidly rotating saw, and advances the pusher toward the saw, as the latter cuts thereinto, by slightly turning the hand-lever $3^a$, until the rotating saw cuts a circular blank from the shell.

During the cutting of a blank it is important that water be plentifully supplied to the shell and saw; for this purpose I provide the novel water-supplying devices illustrated in the drawings. These consist of two adjustable nozzles 5, which are adjustably attached to supports on the blank trap 4, or other convenient part of the machine; and the nozzles are so arranged that their streams converge upon the saw and shell at the cutting point in a manner to thoroughly clean out the saw-dust and keep the saw, shell and blank cool. The nozzles 5 are preferably constructed and mounted in a similar manner, so that the description of one will explain both. Each nozzle 5 may be adjustably attached to a short metal tube $5^a$, by a threaded connection so that by turning the nozzle up or down on such tube the size of the stream discharged therefrom may be regulated. The tube $5^a$ may in turn be connected to or formed with a pipe section $5^b$, which in turn may be fastened to a sleeve $6^b$ attached to a threaded stem 6, which stem is passed through a slot $4^b$ in a stud $4^a$ projecting from the upper side of the button blank trap 4, or other suitable part of the machine. The shank 6 is threaded and engaged by thumb-nut $6^a$, which when tightened will secure the parts rigidly and hold the nozzle firmly in any position to which it is adjusted. The water may be supplied to the pipe section $5^b$ by hose $5^c$ connected with any suitable water supply. The slot $4^b$ enables the shank and nozzle to be tilted in a vertical plane relatively to the saw, and the shank 6 rotatably engaging in said slot enables the nozzle to be adjusted in a horizontal plane relative to the saw; and consequently, by reason of such capability for vertical and horizontal adjustment, the nozzles 5 can be set at any desired angle relative to the saw and to each other, so as to discharge the jets of water issuing therefrom against the saw and shell in the best and most advantageous manner, to cool the saw and blank and shell and effectually wash away the cuttings and dust made by the saw. These novel nozzle supports enable the operator of such a machine to adjust the water supply so as to most effectually cleanse the saw and shell in the manner most satisfactory and advantageous to himself. And by providing this ample supply of water directly from both sides of the saw, the work of the operator is greatly facilitated; and with this apparatus he can much more effectively and readily do the work.

What I claim is:

1. In a machine for cutting button blanks from shells, the combination of a tubular saw, and means for presenting a shell to the saw to be cut, of a pair of convergent adjustable nozzles for directing converging jets of water onto the saw and shell during the cutting operation.

2. In a machine for cutting button blanks from shells, the combination of a tubular saw, and means for presenting a shell to the saw, a lug adjacent the saw, a support adjustably attached to said lug, and a nozzle attached to said support and adapted to supply water to the saw during the cutting operation.

3. In a hand machine for cutting button blanks from shells, the combination of a tubular saw and a pusher for presenting a shell to the saw, a slotted lug adjacent the saw, a threaded shank adjustably engaging the slot in said lug, and a nozzle attached to said shank and adapted to supply water to the saw during the cutting operation.

4. In a machine for cutting button blanks from shells, the combination of a rotary tubular saw, means for presenting a shell to the saw, and lugs on opposite sides of said saw; with a shank adjustably engaging each lug, means for securing the shanks when adjusted, and a nozzle attached to each shank, said nozzles being adjustable vertically and horizontally so as to direct converging jets of water onto the shell and saw at the desired points, substantially as described.

5. In a hand machine for cutting button blanks from shells, the combination of a rotary tubular saw, a pusher, and button blank trap, slotted lugs on opposite sides of said button blank trap, a sleeve shank adjustably engaging each slotted lug, a thumb-nut for securing said shank to the lug, and a nozzle attached to each shank, said nozzles being adjustable vertically and horizontally so as to direct converging jets of water onto the shell and saw at the desired points, substantially as described.

In testimony that I claim the foregoing as my own, I affix my signature in presence of two witnesses.

THOMAS F. BARRY.

Witnesses:
  M. W. STAPLETON,
  E. N. SMITH.

---

Copies of this patent may be obtained for five cents each, by addressing the "Commissioner of Patents, Washington, D. C."